United States Patent
Kondo

(10) Patent No.: US 6,442,131 B1
(45) Date of Patent: Aug. 27, 2002

(54) SELECTIVE VP PROTECTION METHOD IN ATM NETWORK

(75) Inventor: Toshiya Kondo, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/088,230

(22) Filed: Jun. 1, 1998

(30) Foreign Application Priority Data

Jun. 2, 1997 (JP) ............................................. 9-142852

(51) Int. Cl.[7] .............................. H04J 3/14; H04L 12/26
(52) U.S. Cl. ...................... 370/218; 370/244; 370/395.1
(58) Field of Search ................................. 370/216–228, 370/241, 242, 244, 395, 397, 398, 399, 248, 249, 250, 395.1; 714/43, 48, 49, 57; 709/239

(56) References Cited

U.S. PATENT DOCUMENTS

| | | | |
|---|---|---|---|
| 5,343,462 A | * 8/1994 | Seihata et al. | 370/244 |
| 5,461,607 A | * 10/1995 | Miyagi et al. | 370/244 |
| 5,600,630 A | * 2/1997 | Takano et al. | 370/218 |
| 5,627,821 A | * 5/1997 | Miyagi | 370/242 |
| 5,659,540 A | * 8/1997 | Chen et al. | 370/249 |
| 5,790,525 A | * 8/1998 | Ono et al. | 370/244 |
| 5,838,924 A | * 11/1998 | Anderson et al. | 709/239 |
| 5,974,045 A | * 10/1999 | Ohkura et al. | 370/395 |
| 6,122,759 A | * 9/2000 | Ayanoglu et al. | 714/57 |
| 6,167,025 A | * 12/2000 | Hsing et al. | 370/216 |

FOREIGN PATENT DOCUMENTS

| | | |
|---|---|---|
| JP | 1268335 | 10/1989 |
| JP | 5-235983 | 9/1993 |
| JP | 7-58751 | 3/1995 |
| JP | 7202897 | 8/1995 |
| JP | 8-237253 | 9/1996 |

OTHER PUBLICATIONS

Office Action Issued By the Japanese Patent Office on Feb. 16, 1999 in the Corresponding Japanese Application and an English Translation Thereof.

* cited by examiner

Primary Examiner—Chau Nguyen
Assistant Examiner—Soon-Dong Hyun
(74) Attorney, Agent, or Firm—Dickstein Shapiro Morin & Oshinsky LLP

(57) ABSTRACT

A selective VP protection method in an ATM network for protecting a virtual path connection selectively employing VP end protection and arbitrary VP protection is proposed. In the method, the VP-AIS cell which is transmitted downward by each failure detecting node is composed including an area for carrying a switching flag which indicates the presence or absence of execution of the arbitrary VP protection by the failure detecting nodes. When an ATM cross-connect node capable of executing the arbitrary VP protection detected a line failure, the failure detecting ATM cross-connect node determines whether or not it executes the arbitrary VP protection in order to relieve the line failure, and transmits downward the VP-AIS cell in which the switching flag has been set according to the determination. The VP end node which received the VP-AIS cell refers to the switching flag and executes the VP end protection if the switching flag indicated the absence of execution of the arbitrary VP protection by the failure detecting nodes. By adequate selective use of the arbitrary VP protection and the VP end protection according to the method, high speed VP protection in an ATM network and high compatibility between various types of VP end protection and various types of arbitrary VP protection can be realized.

9 Claims, 5 Drawing Sheets

O : DETECTION OF FAILURE, TRANSMISSION OF VP-AIS CELL
● : DETECTION OF VP-AIS CELL

SELECTIVE VP PROTECTION METHOD IN ATM NETWORK

BACKGROUND OF THE INVENTION

The present invention relates to a selective VP (Virtual Path) protection method, and in particular, to a selective VP protection method for performing protection of virtual paths in an ATM network comprising; a plurality of ATM cross-connect nodes, selectively employing VP end protection (VP protection executed by VP end nodes) and arbitrary type of VP protection executed by ATM cross-connect nodes other than the VP end nodes, in which an area of the VP-AIS (Alarm Indication Signal) cell transmitted by ATM cross-connect nodes which detected failure is utilized as information for selecting and determining the VP protection method.

DESCRIPTION OF THE PRIOR ART

Various kinds of VP protection methods (i.e. methods for protecting virtual paths established between VP end nodes) in ATM networks composed of a plurality of ATM cross-connect nodes have been proposed.

FIGS. 1 and 2 are schematic diagrams showing a general conventional VP protection method in an ATM network system. The ATM network system shown in FIGS. 1 and 2 comprises six ATM cross-connect nodes XC11~XC16 and ATM transmission lines connecting the ATM cross-connect nodes XC11~XC16. In the ATM network system of FIGS. 1 and 2, the ATM cross-connect nodes XC11 and XC 12, XC12 and XC13, XC13 and XC14, XC14 and XC15, XC15 and XC11, XC12 and XC16, and XC16 and XC13 are connected by the ATM transmission lines.

FIG. 1 is conceptually showing a case where a line failure 23 such as disconnection of optical fibers etc. occurred on the transmission line between the ATM cross-connect nodes XC12 and XC13 when a virtual path connection XC11-XC12-XC13-XC14 is established between the ATM cross-connect nodes XC11 and XC14.

The ATM network system composed of the ATM cross-connect nodes XC11~XC16 employs both VP end protection (VP protection executed by VP end nodes) and arbitrary VP protection. Here, the VP end protection means VP protection which is executed by VP end nodes of a virtual path. At present, the VP end protection can be classified into the following types.

I. pre-planned VP end protection
  ① dedicated resources VP end protection
    (with preset alternative routes and bandwidths)
  ② semi-dedicated resources VP end protection
    (with preset alternative routes)
II. real time restoration VP end protection
  (or on-demand resources VP end protection)

The VP end protection executed by the VP end nodes XC11 and XC14 in FIGS. 1 and 2 includes the above three types of VP end protection. The arbitrary VP protection means arbitrary type of VP protection in its literal sense which is spontaneously executed by adjacent ATM cross-connect nodes other than the VP end nodes. The arbitrary VP protection includes APS (Automatic Protection Switching) which is employed in SDH (Synchronous Digital Hierarchy) and 'section protection switching' which will described below, for example.

The VP end protection is executed between the ATM cross-connect nodes (VP end nodes) XC11 and XC14 using a route XC11-XC15-XC14 as an alternative route of the route XC11-XC12-XC13-XC14, and the arbitrary VP protection is executed between the ATM cross-connect nodes XC12 and XC13. In the case where the section protection switching is executed as the arbitrary VP protection between the ATM cross-connect nodes XC12 and XC13, a route XC12-XC16-XC13 is used as an alternative route of the route XC12-XC13.

FIG. 2 is conceptually showing a case where a node failure 24 occurred at the ATM cross-connect node XC12 when a virtual path connection XC11-XC12-XC13-XC14 is established between the ATM cross-connect nodes XC11 and XC14. The node failures are roughly classified into equipment failures such as breakage of optical transmitting devices (laser diodes etc.) and control abnormality such as a failure of routing LSI.

In the following, the conventional VP protection method in the ATM network system of FIGS. 1 and 2 employing both the VP end protection and the arbitrary VP protection will be described.

When the line failure 23 occurred on the transmission line XC12-XC13 as shown in FIG. 1, the arbitrary VP protection 32 is executed between the ATM cross-connect nodes XC12 and XC13 which detected the line failure 23. In the case where the section protection switching is executed as the arbitrary VP protection 32, the alternative route XC12-XC16-XC13 is used instead of the route XC12-XC13 and thereby communication between the VP end nodes XC11 and XC14 is secured via the route XC11-XC12-XC16-XC13-XC14. Incidentally, in the case where the transmission line XC12-XC13 includes 'work' and 'standby' signal lines and the line failure 23 occurred on a work signal line between the ATM cross-connect nodes XC12 and XC13, the ATM cross-connect nodes XC12 and XC13 can execute switching from the work signal line to the standby signal line according to the APS, instead of the section protection switching. FIG. 1 is showing a case where the section protection switching is executed by the ATM cross-connect nodes XC12 and XC 13, for example.

On the other hand, when the node failure 24 occurred at the ATM cross-connect node XC12 as shown in FIG. 2, the VP end protection 33 is executed between the ATM cross-connect nodes XC11 and XC14 which are the VP end nodes of the virtual path connection XC11-XC12-XC13-XC14. In the VP end protection 33, the alternative route XC11-XC15-XC14 is used instead of the route XC11-XC12-XC13-XC14 and thereby communication between the VP end nodes XC11 and XC14 is secured via the route XC11-XC15-XC14.

An example of pre-planned VP end protection method is disclosed in Japanese Patent Application Laid-Open No. HEI8-237253 'METHOD AND APPARATUS FOR VIRTUAL PATH SWITCHING IN ATM NETWORK'. In the method, an operating virtual path and a standby (spare) virtual path are doubly set between two VP end nodes and virtual path switching from the operating virtual path to the standby virtual path is executed by the VP end nodes in the case of failure. In the VP end protection method, an OAM (Operation And Maintenance) cell, including an switching instruction code for indicating the presence/absence of switching request and a sequence number, is used for controlling the virtual path switching. The transmitting end node transmits the switching control OAM cells periodically on both of the operating virtual path and the standby virtual path, and the receiving end node detects the phase difference between the switching control OAM cells supplied via the two virtual paths by comparing the sequence numbers included in the switching control OAM cells. If the switching instruction code requesting virtual path switching included in the switching control OAM cell reached the receiving end node via the standby virtual path in perfect form, the virtual path switching from the operating virtual path to the standby virtual path is performed compensating the detected phase difference. By the VP end protection method, the switching to the standby virtual path can be executed without instantaneous chopping (i.e. maintaining synchronization of ATM cell timing between the operating and standby virtual paths) and with confirmation of normal operation of the standby virtual path.

Another example of pre-planned VP end protection method is disclosed in Japanese Patent Application Laid-Open No. HEI5-235983 'APPARATUS AND METHOD FOR VIRTUAL PATH SWITCHING'. In the method, one or more alternative virtual paths are predetermined corresponding to a work virtual path, and information about the alternative virtual paths are prestored in an alternative virtual path information storing means of a virtual path switching device of each switching end nodes. The virtual path switching device of each switching end nodes further includes a virtual path capacity management means for storing and managing the capacity of the work virtual path, and a link capacity management means for storing and managing the capacities of links which are connected to the switching end node. When a failure is detected by a switching node, the node modifies its routing table into an alternative virtual path according to information which is stored in the alternative virtual path information storing means, the virtual path capacity management means and the link capacity management means, and transmits a switching control signal including information about the virtual path capacity and virtual path identifier to the adjacent node on the alternative virtual path. Each node on the alternative virtual path which received the switching control signal selects a link containing the alternative virtual path from links which are connected to the node according to the information in the switching control signal, and transmits the switching control signal to the next node on the alternative virtual path. Another switching end node of the alternative virtual path which received the switching control signal via the alternative virtual path executes switching control of ATM cell transmission route from the work virtual path with failure to the alternative virtual path according to the information included in the switching control signal. According to the method, the switching control signal is transmitted on the alternative virtual path only and thus the amount of control signals necessary for the virtual path switching can be decreased, and the virtual path switching can be executed without control of a central control node. Therefore, the failure on the ATM network can be relieved with high speed.

The aforementioned conventional VP protection method in an ATM network system shown in FIGS. 1 and 2 employing both the VP end protection and the arbitrary VP protection involves the following problem. The VP end protection executed by the VP end nodes is started according to reception of VP-AIS cells which are transmitted from failure detecting nodes. However, the VP end nodes can not judge the presence or absence of the arbitrary VP protection executed on the route between the VP end nodes, by information of the VP-AIS cell according to the present standard VP-AIS cell format. Thus, even in the case where a line failure on the route can be relieved immediately by means of the arbitrary VP protection, the VP end protection is started by the VP end nodes.

Referring to FIG. 4 for example, when the line failure 23 occurred on the transmission line XC12-XC13, the arbitrary VP protection is executed between the failure detecting nodes XC12 and XC13. However, the VP end protection 33 is started by the VP end nodes XC11 and XC14 according to the reception of the standard VP-AIS cells transmitted by the failure detecting nodes XC12 and XC13. Thus, even in the case where the line failure 23 can be relieved immediately by means of the arbitrary VP protection 32, the VP end protection 33 is started by the VP end nodes XC12 and XC13, thereby immediate relief by the arbitrary VP protection 32 is prevented.

The above problem occurs since the conventional VP end protection is started by the VP end nodes according to reception of the standard VP-AIS cells in which information about the presence or absence of the arbitrary VP protection executed between the VP end nodes is not included.

At present, there has been proposed no selective VP protection method employing both the VP end protection and the arbitrary VP protection selectively, which can provide high efficiency of VP protection and high compatibility between the VP end protection and the arbitrary VP protection.

SUMMARY OF THE INVENTION

It is therefore the primary object of the present invention to provide a selective VP protection method in an ATM network employing both the VP end protection and the arbitrary VP protection selectively, which can provide both high efficiency of VP protection and high compatibility between the VP end protection and the arbitrary VP protection.

In accordance with a first aspect of present invention, there is provided a selective VP protection method for protecting a virtual path connection established between VP end nodes in an ATM network which is composed of a plurality of ATM cross-connect nodes, employing both VP end protection and arbitrary VP protection selectively. In the selective VP protection method, the VP-AIS cell which is transmitted downward by each failure detecting node is composed including an area for carrying a switching flag which indicates the presence or absence of execution of the arbitrary VP protection by the failure detecting nodes. When an ATM cross-connect node capable of executing the arbitrary VP protection detected a line failure, the failure detecting ATM cross-connect node determines whether or not it executes the arbitrary VP protection in order to relieve the line failure, and transmits downward the VP-AIS cell in which the switching flag has been set according to the determination. The VP end node which received the VP-AIS cell refers to the switching flag and executes the VP end protection if the switching flag indicated the absence of execution of the arbitrary VP protection by the failure detecting nodes.

In accordance with a second aspect of present invention, in the first aspect, the failure detecting ATM cross-connect node determines to execute the arbitrary VP protection if it judged that the line failure can be relieved by the arbitrary VP protection by the failure detecting ATM cross-connect nodes.

In accordance with a third aspect of present invention, in the first aspect, the area for carrying the switching flag is placed in unusual octets of the standard VP-AIS cell format.

In accordance with a fourth aspect of present invention, in the third aspect, the area for carrying the switching flag is a 1-bit area.

In accordance with a fifth aspect of present invention, in the first aspect, the VP end node executes dedicated resources VP end protection as the VP end protection.

In accordance with a sixth aspect of present invention, in the first aspect, the VP end node executes semi-dedicated resources VP end protection as the VP end protection.

In accordance with a seventh aspect of present invention, in the first aspect, the VP end node executes real time restoration VP end protection as the VP end protection.

In accordance with an eighth aspect of present invention, in the first aspect, the failure detecting ATM cross-connect node executes APS (Automatic Protection Switching) as the arbitrary VP protection.

In accordance with a ninth aspect of present invention, in the first aspect, the failure detecting ATM cross-connect node executes section protection switching as the arbitrary VP protection.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
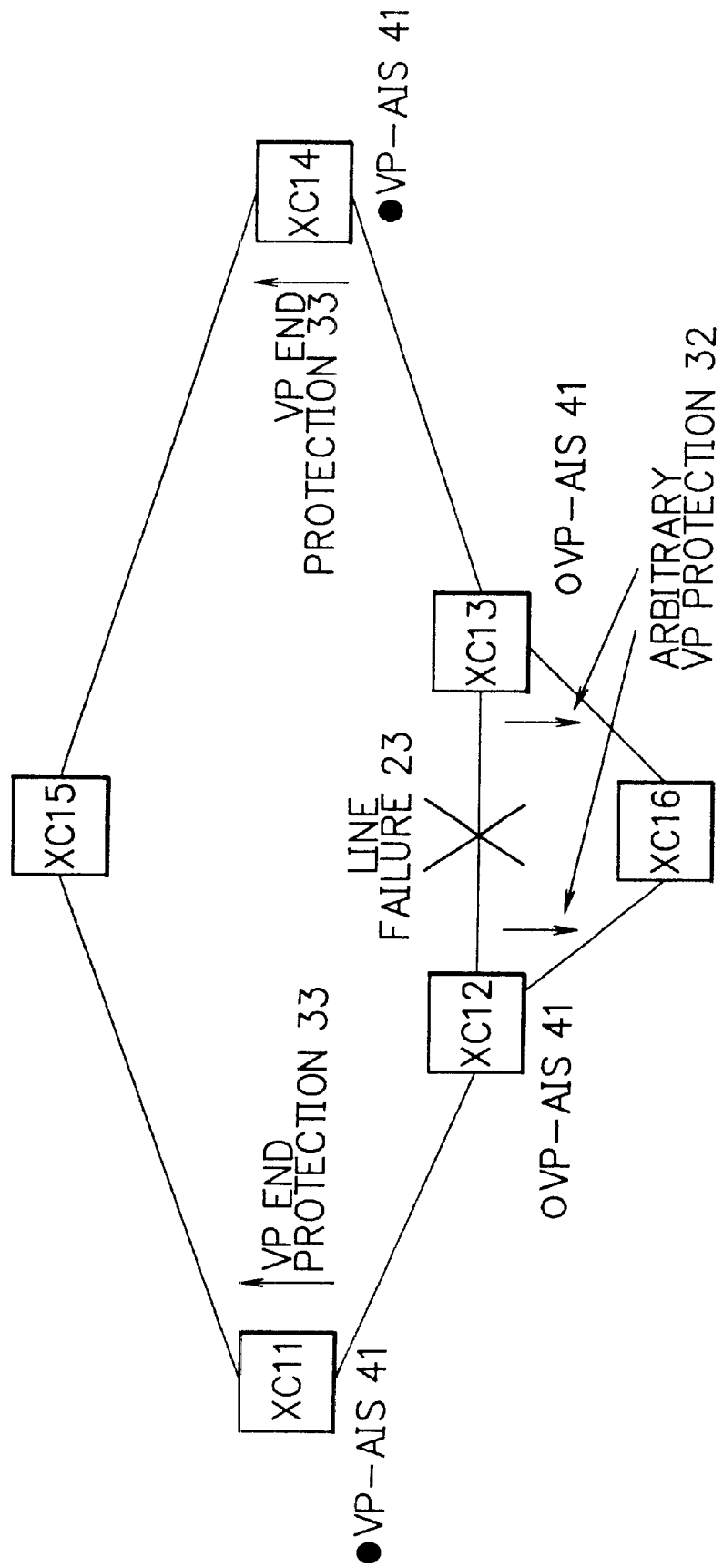
FIG. 1 is a schematic diagram showing general conventional VP protection method in an ATM network system in the case where a line failure occurred on a transmission line between ATM cross-connect nodes.

Referring now to the drawings, a description will be given in detail of preferred embodiments in accordance with the present invention.

Figure 3:
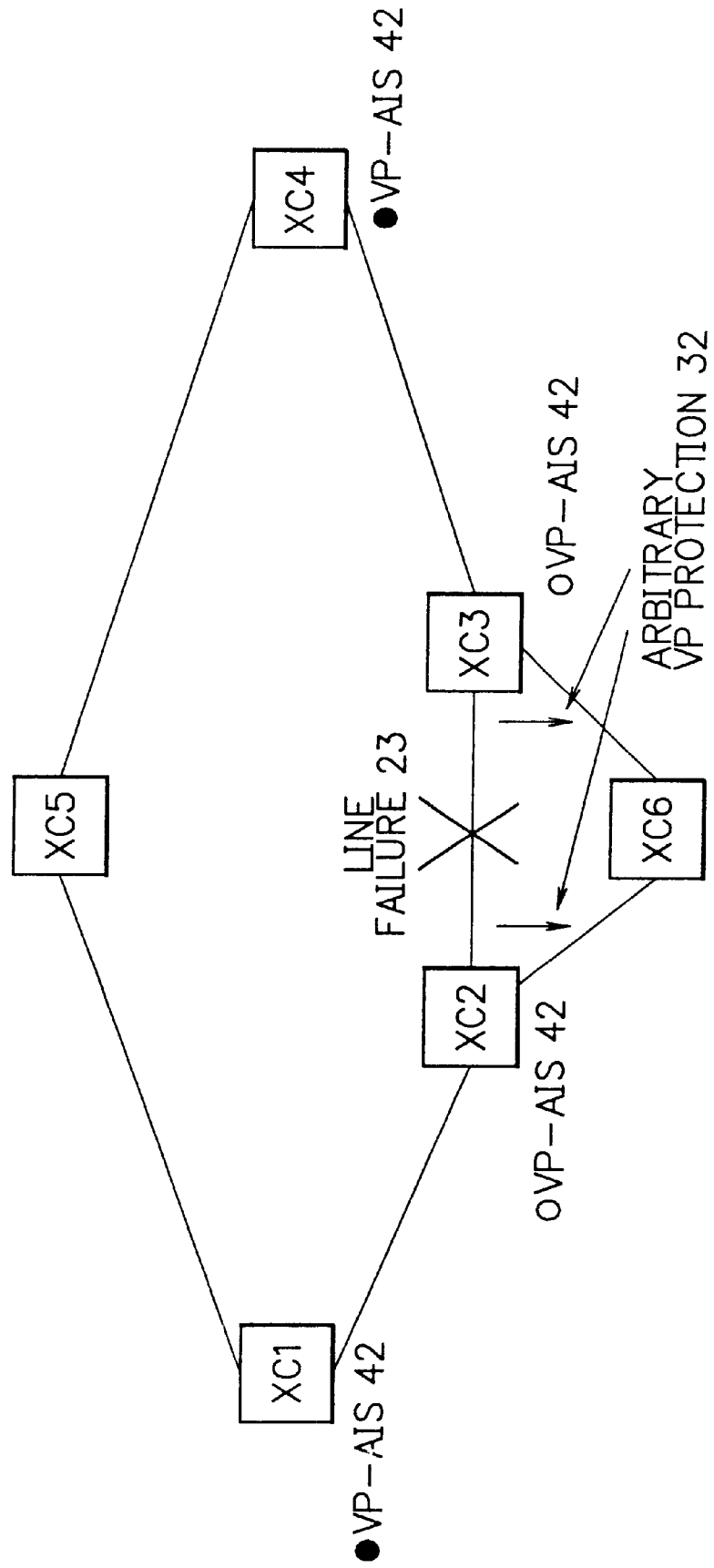
FIG. 3 is a schematic diagram showing the selective VP protection method in an ATM network system according to the present invention in the case where a line failure occurred on a transmission line between ATM cross-connect nodes.
Figure 4:
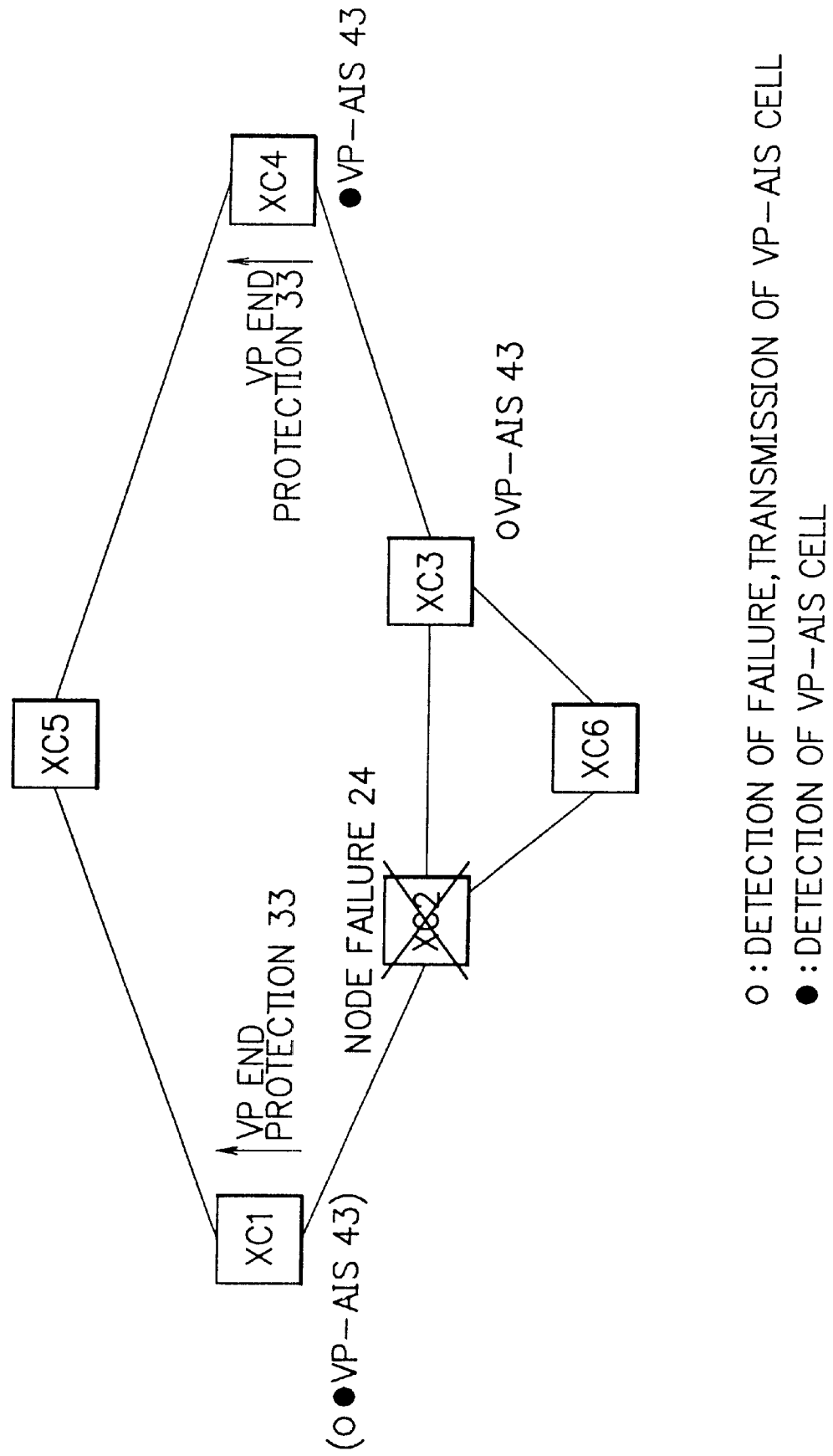
FIG. 4 is a schematic diagram showing the selective VP protection method in an ATM network system according to the present invention in the case where a node failure occurred at an ATM cross-connect node.

FIGS. 3 and 4 are schematic diagrams showing a VP protection method in an ATM network system according to an embodiment of the present invention. The ATM network system of FIGS. 3 and 4 comprises 6 ATM cross-connect nodes XC1~XC6 and ATM transmission lines connecting the ATM cross-connect nodes XC1~XC6. In the ATM network system, the ATM cross-connect nodes XC1 and XC2, XC2 and XC3, XC3 and XC4, XC4 and XC5, XC5 and XC1, XC2 and XC6, and XC6 and XC3 are connected by the ATM transmission lines.

FIG. 3 is conceptually showing a case where a line failure 23 occurred on the transmission line between the ATM cross-connect nodes XC2 and XC3 when a virtual path connection XC1-XC2-XC3-XC4 is established between the ATM cross-connect nodes XC1 and XC4, and FIG. 4 is conceptually showing a case where a node failure 24 occurred at the ATM cross-connect node XC2 when a virtual path connection XC1-XC2-XC3-XC4 is established between the ATM cross-connect nodes XC1 and XC4. The line failure 23 includes disconnection of optical fibers etc., and the node failure 24 includes equipment failures such as breakage of optical transmitting devices (laser diodes etc.) and control abnormality such as a failure of routing LSI etc.

The ATM network system composed of the ATM cross-connect nodes XC1~XC6 employs both the VP end protection and the arbitrary VP protection selectively. As mentioned before, the VP end protection means VP protection which is executed by VP end nodes of a virtual path, and the VP end protection can be classified into 'pre-planned' VP end protection ('dedicated resources' VP end protection in which alternative routes and bandwidths are preset and 'semi-dedicated resources' VP end protection in which alternative routes are preset) and 'real time restoration' VP end protection (or 'on-demand resources' VP end protection). Although a simple network is shown in FIGS. 3 and 4 for brevity, the VP end protection executed in the selective VP protection method according to the embodiment includes the above three types of VP end protection. The arbitrary VP protection means arbitrary type of VP protection in its literal sense which is spontaneously executed by adjacent ATM cross-connect nodes other than the VP end nodes. The arbitrary VP protection includes the APS (Automatic Protection Switching) and the section protection switching which have been explained before, for example.

The VP end protection is executed between the ATM cross-connect nodes (VP end nodes) XC1 and XC4 using a route XC1-XC5-XC4 as an alternative route of the route XC1-XC2-XC3-XC4, and the arbitrary VP protection is executed between the ATM cross-connect nodes XC2 and XC3. In the case where the section protection switching is executed as the arbitrary VP protection between the ATM cross-connect nodes XC2 and XC3, a route XC2-XC6-XC3 is used as an alternative route of the route XC2-XC3.

Figure 2:
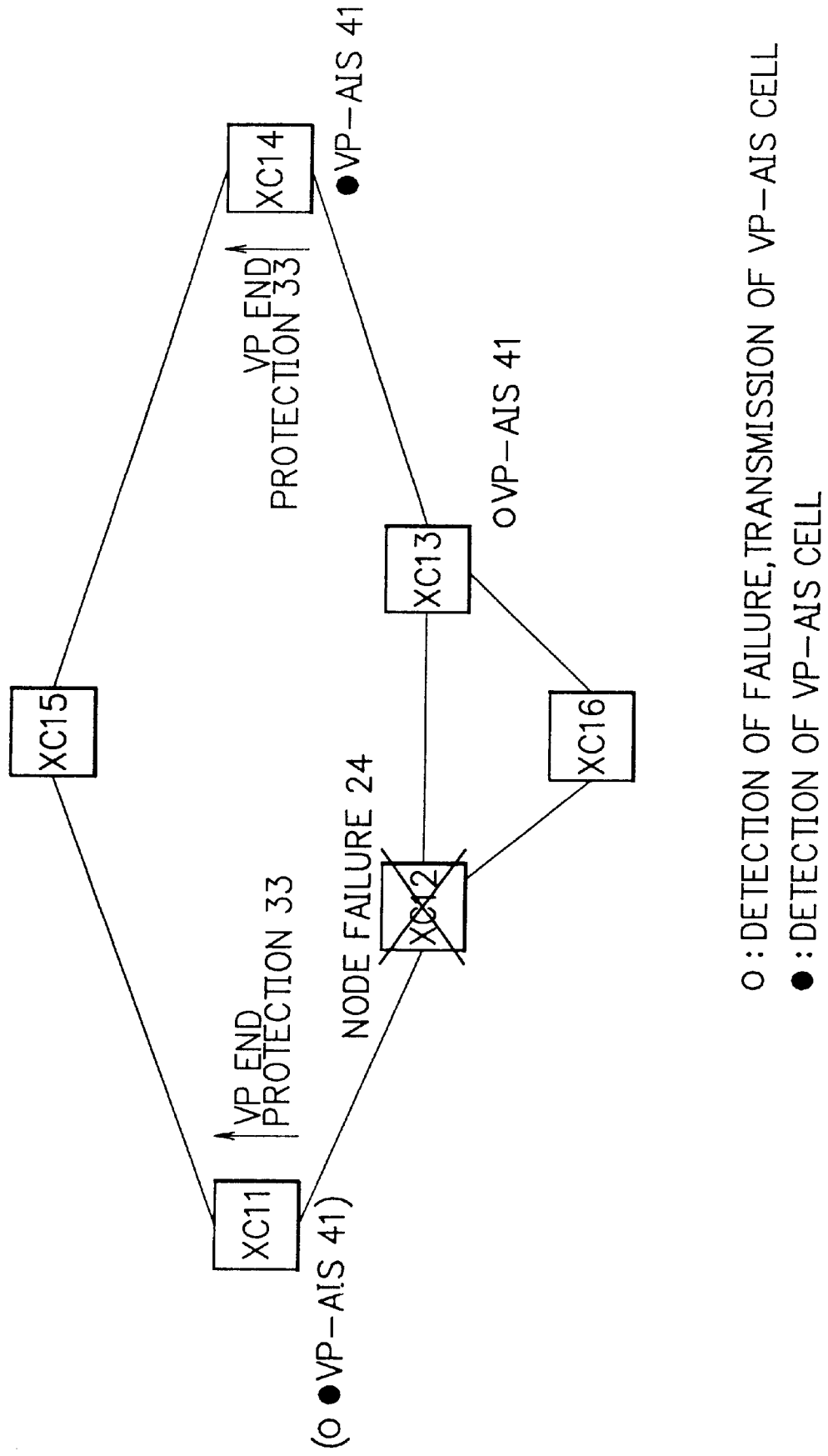
FIG. 2 is a schematic diagram showing general conventional VP protection method in an ATM network system in the case where a node failure occurred at an ATM cross-connect node.

Incidentally, the white circles (○) in FIGS. 3 and 4 (in FIGS. 1 and 2 as well) indicate detection of a VP failure and transmission of VP-AIS cells downward by failure detecting nodes, and the black circles (●) in FIGS. 3 and 4 indicate detection of the VP-AIS cells by the VP end nodes XC1 and XC4. In FIG. 3, the line failure 23 occurred on the transmission line XC2-XC3 is detected by the ATM cross-connect nodes XC2 and XC3, and VP-AIS cells are periodically transmitted downward by the failure detecting nodes XC2 and XC3 and received by the VP end nodes XC1 and XC4 respectively. In FIG. 4, the node failure 24 occurred at the ATM cross-connect node XC2 is detected by the ATM cross-connect nodes XC1 and XC3, and a VP-AIS cells are periodically transmitted downward by the failure detecting node XC3 and received by the VP end node XC4. The ATM cross-connect node XC1 can be regarded to execute both detection of the node failure 24 and reception of the VP-AIS cell. The operations of detection of VP failures and transmission of VP-AIS cells are basically the same as the conventional VP protection method of FIGS. 1 and 2 employing both the VP end protection and the arbitrary VP protection.

First, a basic outline of the selective VP protection method according to this embodiment employing both the VP end protection and the arbitrary VP protection selectively will be explained. Referring to FIGS. 3 and 4, a VP connection XC1-XC2-XC3-XC4 is established between the VP end nodes XC1 and XC4.

When the line failure 23 occurred on the transmission line XC2-XC3 as shown in FIG. 3, the ATM cross-connect nodes XC2 and XC3 detect the line failure 23, and the arbitrary VP protection 32 is performed by the ATM cross-connect nodes XC2 and XC3. In the case where the section protection switching is executed as the arbitrary VP protection 32, the alternative route XC2-XC6-XC3 is used instead of the route XC2-XC3 and thereby communication between the VP end nodes XC1 and XC4 is secured via the route XC1-XC2-XC6-XC3-XC4. Incidentally, in the case where the transmission line XC2-XC3 includes 'work' and 'standby' signal lines and the line failure 23 occurred on a work signal line between the ATM cross-connect nodes XC2 and XC3, the ATM cross-connect nodes XC2 and XC3 can execute switching from the work signal line to the standby signal line according to the APS, instead of the section protection switching. FIG. 3 is showing a case where the section protection switching is executed by the ATM cross-connect nodes XC2 and XC3, for example.

On the other hand, when the node failure 24 occurred at the ATM cross-connect node XC2 as shown in FIG. 4, the VP end protection 33 is executed between the ATM cross-connect nodes XC1 and XC4 which are the VP end nodes of the virtual path connection XC1-XC2-XC3-XC4. In the VP end protection 33, the alternative route XC1-XC5-XC4 is used instead of the route XC1-XC2-XC3-XC4 and thereby communication between the VP end nodes XC1 and XC4 is secured via the route XC1-XC5-XC4.

Figure 5:
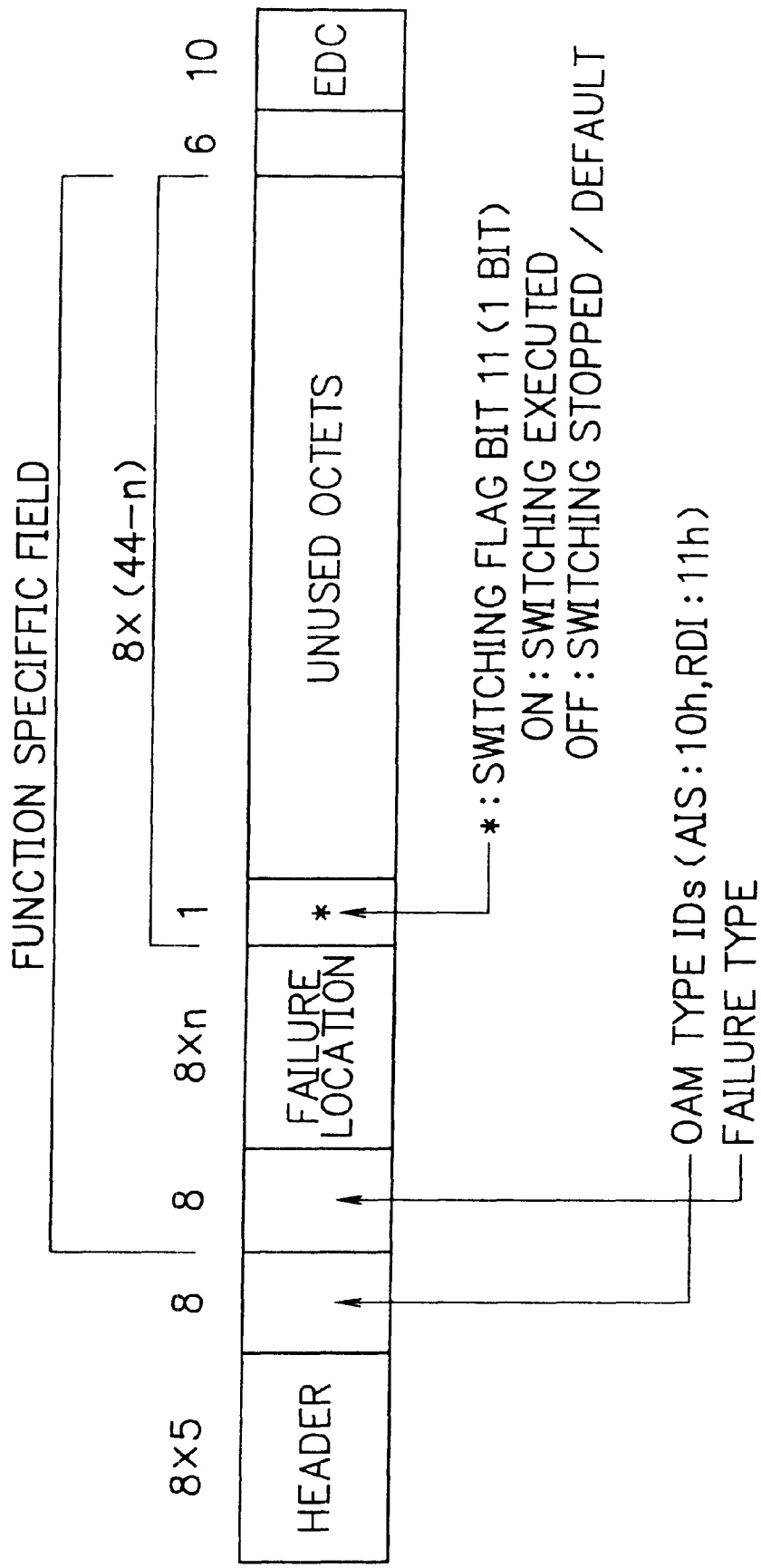
FIG. 5 is a schematic diagram showing a VP-AIS cell format which is employed in an embodiment of the present invention.

FIG. 5 is a schematic diagram showing a VP-AIS cell format which is employed in the embodiment in which a switching flag bit is defined. Referring to FIG. 5, the VP-AIS cell is composed of a header of 8×5 bits, an OAM type ID field of 8 bits indicating OAM (Operation And Maintenance) type, a failure type field of 8 bits indicating failure type, a failure location field of 8×n bits indicating failure location, the switching flag bit indicating whether or not arbitrary VP protection is executed by the failure detecting nodes (indicated with an asterisk (*)), unused octets (8×(44-n) bits) of the standard VP-AIS cell format in which the switching flag bit is defined, etc.

As shown in FIG. 5, in this embodiment, the switching flag bit 11 indicating whether or not arbitrary VP protection is during execution is defined in the unused octets of the standard VP-AIS cell format. The switching flag bit 11 is set ON if the arbitrary VP protection is during operation, and is set OFF as the default and if the arbitrary VP protection is stopped. The ON setting of the switching flag bit 11 is executed by each failure detecting node if the failure detecting node determined to execute the arbitrary VP protection in order to relieve the line failure.

When an ATM cross-connect node capable of executing the arbitrary VP protection detected a line failure, the failure detecting ATM cross-connect node determines whether or not it executes the arbitrary VP protection. Preferably, the failure detecting node first judges whether or not the line failure can be relieved by the arbitrary VP protection executed by the failure detecting nodes, and determines to execute the arbitrary VP protection if it judged that the line failure can be relieved. Then, the failure detecting node transmits downward the VP-AIS cell shown in FIG. 5 in which the switching flag bit 11 has been set ON or OFF according to the determination. Generally, the transmission of the VP-AIS cell is executed periodically until a VP failure is relieved.

Each of the VP end nodes which received the VP-AIS cell refers to the switching flag bit 11 in the VP-AIS cell. If the switching flag bit 11 is ON, the VP end node judges that arbitrary VP protection is during execution in the upper stream, and does not execute the VP end protection. On the other hand, if the switching flag bit 11 is OFF, the VP end node judges that a VP failure which can not be relieved (i.e. multiple line failures, node failures, etc.) occurred in the upper stream, and executes the VP end protection.

By use of the switching flag bit 11 in the VP-AIS cell according to the embodiment, the selective VP protection in the ATM network shown in FIGS. 3 and 4 is performed as follows.

When a line failure 23 which can be relieved by the arbitrary VP protection occurred on the transmission line XC2-XC3 as shown in FIG. 3, arbitrary VP protection 32 is performed by the failure detecting nodes XC2 and XC3 which are provided with functions for executing the arbitrary VP protection, and the communication between the VP end nodes XC1 and XC4 is secured via the route XC1-XC2-XC6-XC3-XC4.

Here, each of the failure detecting nodes XC2 and XC3 transmits downward the VP-AIS cell 42 in which the switching flag bit 11 has been set ON. Therefore, each of the VP end nodes XC1 and XC4 judges that the arbitrary VP protection is executed in the upper stream, and thus the VP end protection 33 is not started.

On the other hand, when a node failure 24 occurred at the ATM cross-connect node XC2 as shown in FIG. 4, the node failure 24 is detected by the ATM cross-connect nodes XC1 and XC3, and the VP-AIS cells 43 in which the switching flag bit 11 has been set OFF (the default) are transmitted downward. The ATM cross-connect node XC1 in FIG. 4 can be regarded to execute both transmission and reception of the VP-AIS cell 43. The VP end nodes XC1 and XC4 which received the VP-AIS cells 43 refers to the switching flag bit 11 (OFF) and judge that a VP failure which can not be relieved by the arbitrary VP protection 32 occurred in the upper stream, therefore the VP end protection 33 is started and the communication between the VP end nodes XC1 and XC4 is secured via the route XC1-XC5-XC4.

As described above, according to the embodiment, when a line failure 23 which can be relieved by the arbitrary VP protection 32 occurred, the VP end protection 33 is prevented by the VP-AIS cells 43 in which the switching flag bit 11 has been set ON, and the line failure 23 is relieved by means of the arbitrary VP protection 32, thereby the relief can be performed with high speed. By the adequate selective use of the arbitrary VP protection and the VP end protection, high speed VP protection in an ATM network can be realized.

Further, the embodiment utilizes only the presence or absence of execution of the arbitrary VP protection. Therefore, high compatibility between various types of VP end protection and various types of arbitrary VP protection can be realized in the selective VP protection method.

Furthermore, secondary failures and meaningless damages for users which are caused by a VP end protection started after the relief by the arbitrary VP protection can be prevented. Therefore, the selective VP protection method according to the embodiment is beneficial for carriers of ATM networks, especially for large carriers of ATM networks handling large capacity transmission lines.

Incidentally, although the switching flag bit 11 was defined in the standard VP-AIS cell format in the above embodiment, it is also possible to define a larger area in the standard VP-AIS cell format for carrying the switching flag and other related information.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A selective VP protection method employing both VP end protection and arbitrary VP protection for protecting a virtual path connection established between VP end nodes in an ATM network which is comprised of plurality of ATM cross-connect nodes, the method comprising the steps of:

transmitting downward from each failure detecting node, a VP-AIS cell including an area for carrying a switching flag which indicates the presence or absence of execution of arbitrary VP protection;

determining, at each ATM cross-connect node capable of executing arbitrary VP protection which detects a line failure, whether or not to execute the arbitrary VP protection to relieve the line failure;

selectively executing or not executing arbitrary VP protection at each such cross-connect node in accordance with the determination made thereat;

transmitting downward from such cross-connect node the VPS-AIS cell in which the switching flag has been in accordance with the determination made thereat;

receiving a VPS-AIS cell at a VP end node;

determining at each VP end node which receives a VPS-AIS cell, the state of the switching flag therein; and executing VP end protection at each VP end node which receives a VPS-AIS cell, if the switching flag indicates that arbitrary VP protection was not executed by the failure detecting nodes.

2. A selective VP protection method as claimed in claim 1, wherein a failure detecting ATM cross-connect node determines to execute arbitrary VP protection if it is judged that the line failure can be relieved by arbitrary VP protection executed by the failure detecting ATM cross-connect nodes.

3. A selective VP protection method as claimed in claim 1, wherein the area for carrying the switching flag is placed in unusual octets of the standard VP-AIS cell format.

4. A selective VP protection method as claimed in claim 3, wherein the area for carrying the switching flag is a 1-bit area.

5. A selective VP protection method as claimed in claim 1, wherein the VP end node executes dedicated resources VP end protection as the VP end protection.

6. A selective VP protection method as claimed in claim 1, wherein the VP end node executes semi-dedicated resources VP end protection as the VP end protection.

7. A selective VP protection method as claimed in claim 1, wherein the VP end node executes real time restoration VP end protection as the VP end protection.

8. A selective VP protection method as claimed in claim 1, wherein the failure detecting ATM cross-connect node executes APS (Automatic Protection Switching) as the arbitrary VP protection.

9. A selective VP protection method as claimed in claim 1, wherein the failure detecting ATM cross-connect node executes section protection switching as the arbitrary VP protection.

* * * * *